Sept. 2, 1969  H. J. WOODWARD  3,464,732

HOLDER FOR SOIL TESTING INSTRUMENT

Filed Feb. 9, 1968

INVENTOR
HYRUM J. WOODWARD

BY R. Hoffman
ATTORNEY

United States Patent Office 3,464,732
Patented Sept. 2, 1969

3,464,732
HOLDER FOR SOIL TESTING INSTRUMENT
Hyrum J. Woodward, Portland, Oreg., assignor to the United States of America as represented by the Secretary of Agriculture
Filed Feb. 9, 1968, Ser. No. 704,404
Int. Cl. A47f *13/06;* A01d *9/06*
U.S. Cl. 294—19                         1 Claim

ABSTRACT OF THE DISCLOSURE

A commonly used, hand operated instrument for determining the volume of moisture in a soil profile can conveniently take samples only near the surface. To take samples at greater depths, a slotted box-like holder, connected to an extensible handle, is provided by this invention. The sample-taking instrument fits between two slotted walls and is secured by tightening a threaded member on the instrument.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a handle, or holder, for an instrument used to obtain soil samples. More particularly, it relates to a holder to enable the user to take soil samples from the bottom of deep boreholes with an instrument originally designed for sampling near the surface.

In the course of making soil surveys and, in general, in the farming of irrigated land, it is necessary to know the amount of available moisture to permit the proper application of irrigation water. This information, to be of any real value, must be accurate and timely.

Several instruments are commercially available which are intended to take a soil sample of known volume. This sample is then weighed, dried, and reweighed. The difference in weight represents the volume of moisture which was driven off from the original sample.

One such commercially available instrument is the Eley Volumeter. This device takes a sample core of soil and then extrudes an accurately measured portion of the core. When samples are to be taken from relatively shallow (e.g., about 18 inches deep) soils, no difficulty is encountered because the instrument can readily be manipulated at the above mentioned depth. However, as the instrument is rather small (approximately six inches long), it is not possible to take samples from deep boreholes.

It is, therefore, an object of this invention to provide a holder for an instrument, such as the Eley Volumeter, by means of which it will be possible to obtain a soil sample from the bottom of a relatively deep borehole. A further object is to provide such a holder with a handle of variable length. Other objects will become obvious to those skilled in the art from the description which follows and from the accompanying drawings in which.

Figure 3:
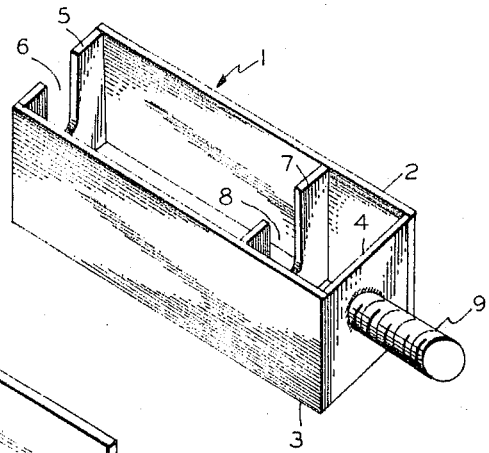
FIGURE 3 shows the details of construction of the holder itself.
Figure 4:
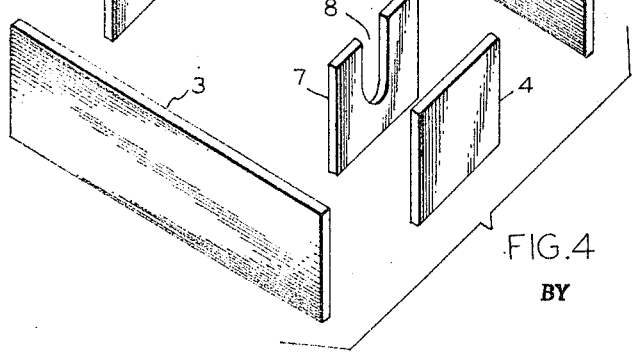
FIGURE 4 is an exploded view showing the component parts of the holder.

Referring to FIGURES 3 and 4, the holder, designated generally as 1, is seen to comprise a box-like structure having a pair of longitudinally-extending side walls 2 and 3, one solid end plate 4, a second end plate 5, provided with a slot 6 open at one end, and a plate 7 provided with a similar slot 8. Plates 5 and 7 and their corresponding slots are of equal size, with slots 6 and 8 located in the same position with respect to the longitudinal axis of the holder. In other words end plate 5 and intermediate plate 7, as well as their respective slots would be congruent if superimposed on one another.

The several plates may be made of any suitable material, as for example, from ⅛ inch steel, and assembled to form the box-like holder by welding or any other suitable method.

Figure 2:
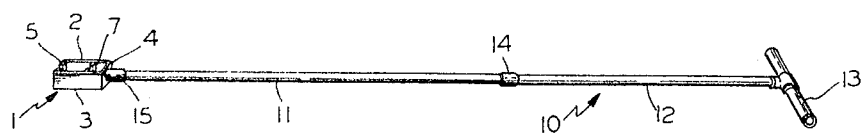
FIGURE 2 shows the holder complete with its handle.

As will be further apparent from FIGURE 3, end plate 4 is provided with a threaded stud 9 for securing the holder to a handle. This is shown in FIGURE 2. The handle, designated generally as 10, may consist of one or more lengths of pipe 11 and 12 threaded at both ends (threads not shown), provided at one extremity with a transverse gripping member 13. The two sections of the handle may be secured to each other by means of a standard threaded sleeve coupling 14, and the whole handle secured to holder 1 by means of a second standard sleeve coupling 15 screwed to stud 9. It will, of course, be understand that the number of pipe sections in the handle is optional with the user and will depend on the required length of the handle.

Figure 1:
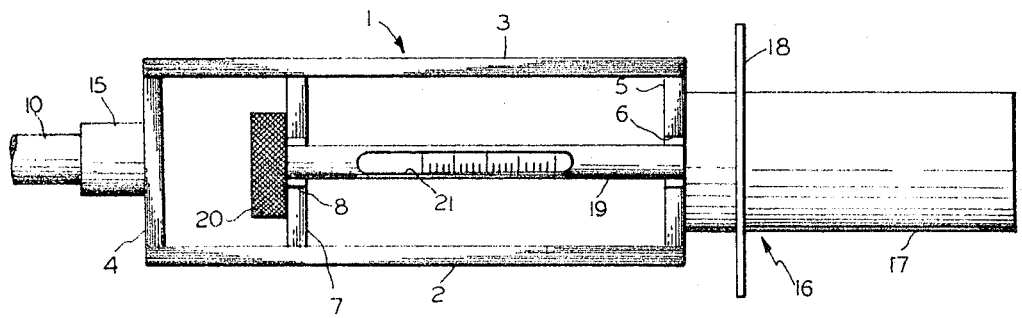
FIGURE 1 is a plan view showing a sample-taking instrument assembled in the holder of this invention.

Referring now to FIGURE 1, which illustrates the device of the present invention in use with an Eley Volumeter, the figure shows the Eley Volumeter, designated generally as 16, in place in the holder. Briefly, the Eley Volumeter comprises a cylindrical member 17 for taking a soil sample and a flange 18 to limit the depth of penetration into the soil. The instrument is also provided with an internal, piston-like member, not shown, to which is secured an external shaft 19, having a threaded portion (also not shown) extending inside the end of cylindrical member 17. A knob 20 at the other end of shaft 19 facilitates turning of the shaft to advance it into the cylindrical member 17.

In use, shaft 19 is withdrawn to its fullest extent and cylinder 17 is forced into the soil to collect a sample core. Shaft 19 is then turned until a portion of the core is extruded. The latter is then cut off and discarded and shaft 19 is once more screwed into the cylinder to a predetermined distance to extrude another portion of the soil core. An accurately drawn scale 21, on shaft 19, enables the user to extrude a core of known length and thereby obtain a sample of accurately determined volume. This sample is used to determine the volume of available soil moisture.

When the above described instrument is used with the holder of this invention to obtain a sample from the bottom of a deep borehole, shaft 19 is screwed out to its fullest extent, enabling the device to be dropped into slots 6 and 8 of holder 1. By turning shaft 19 into cylinder member 17, knob 20 and the opposing end of cylinder 17 are tightened to bear against the outside surfaces of plates 7 and 5, respectively, thereby holding the instrument securely while a deep sample is taken.

It will be readily apparent to those skilled in the art that the dimensions of the box-like holder are not critical, but will depend on the instrument with which the invention is intended to be used. Thus, for the above described use with an Eley Volumeter, the box-like holder may be about 4 inches long with a square cross-section of about 1¼ inches, and made of ⅛ inch steel. Plates 5 and 7 may sutably be placed approximately 3 inches apart, while for the slots in each, a width of ⅜ inch has been found satisfactory. Finally, the ½ inch threaded stud 9, welded to plate 4, provides the means for attaching the holder to handle 10.

Having described my invention, I claim:

1. A holder in combination with a soil receiving and testing instrument comprising:
   (a) a pair of elongated, opposing, parallel side-wall members;
   (b) a first end-wall member comprising a plate with unbroken surface secured to one end of said side-wall members;
   (c) a second end-wall member comprising a slotted plate secured to the other end of said side-wall members, said side-wall and end-wall members together forming an open, box-like structure;
   (d) a slotted plate secured to said side-wall members at a point intermediate said first and second end-wall members, said slotted plate and second end-wall member being adapted to engage parts of said soil testing instrument and hold said instrument rigid while in use; and
   (e) an elongated handle attached to the first end-wall member for manipulating the soil testing instrument at a distance.

References Cited

UNITED STATES PATENTS 3,326,049    6/1967    Eley _____ 73—425.2 X

FOREIGN PATENTS 428,848    7/1911    France.

GERALD M. FORLENZA, Primary Examiner

U.S. Cl. X.R.

73—425.2; 172—22; 294—50.7